United States Patent [19]

Balkanli

[11] Patent Number: 4,593,370

[45] Date of Patent: * Jun. 3, 1986

[54] ENVIRONMENTAL MEASURING AND RECORDING APPARATUS

[76] Inventor: Hayati Balkanli, P.O. Box 35725, Houston, Tex. 77035

[*] Notice: The portion of the term of this patent subsequent to Apr. 24, 2001 has been disclaimed.

[21] Appl. No.: 401,972

[22] Filed: Jul. 26, 1982

[51] Int. Cl.$^4$ ............... G06F 15/20; E21B 47/06
[52] U.S. Cl. ..................... 364/571; 73/154; 364/422; 364/557; 364/558
[58] Field of Search ............ 364/420, 422, 571, 550, 364/551, 179, 170, 172, 176, 557, 558; 365/222; 307/290; 73/708, 151–155

[56] References Cited

U.S. PATENT DOCUMENTS

| | | | |
|---|---|---|---|
| 3,977,245 | 8/1976 | Clark | 73/151 |
| 4,033,186 | 7/1977 | Bresie | 73/154 |
| 4,157,659 | 6/1979 | Murdock | 364/422 |
| 4,158,883 | 6/1979 | Kadono et al. | 365/222 |
| 4,161,782 | 7/1979 | McCracken | 364/179 |
| 4,195,349 | 3/1980 | Balkanli | 364/571 |
| 4,207,618 | 6/1980 | White, Jr. et al. | 365/222 |
| 4,238,842 | 12/1980 | Aichelmann, Jr. | 365/222 |
| 4,292,676 | 9/1981 | Henig | 365/222 |
| 4,444,055 | 4/1984 | Balkanli | 73/708 |

FOREIGN PATENT DOCUMENTS 0911018  9/1972  Canada ............... 364/179

Primary Examiner—Joseph Ruggiero
Attorney, Agent, or Firm—Richard K. Robinson

[57] ABSTRACT

An environmental measuring and recording apparatus includes a pressure transducer for measuring of pressure conditions in an oil reservoir. A temperature transducer is used to measure the temperature to which the pressure transducer is subject. The measured temperature is used to compensate the pressure transducer and a resulting compensated signal is digitized and stored in a memory unit. Because of the extreme environmental conditions in which the electronic apparatus is operating the memory unit has the capabilities of periodically being refreshed and to retain data after the removal of power.

12 Claims, 3 Drawing Figures

4,593,370

ENVIRONMENTAL MEASURING AND RECORDING APPARATUS

BACKGROUND OF THE INVENTION

The invention relates to instruments for measuring and recording of environmental conditions. Specifically, this invention relates to electronic logging instruments for use in the bottom of oil wells or the like for sensing, digitizing, and compensating for any anomaly, and recording pressure and temperature conditions.

It is imperative that the parameters of an oil bearing reservoir be measured so that the oil can be efficiently extracted from the reservoir. The parameters of the oil reservoir, in particular, the pressure, must be taken as a function of time. In addition to pressure, the temperature of the oil reservoir must be measured and used to compensate for anomalies in the pressure measurement. The most commonly used measuring instrument is a helical Bourdon tube and a chart which is driven by a mechanical clock mechanism. The temperature is measured by a different instrument in the proximity of the pressure instrument but generally at a different location. A stylus attached to the Bourdon tube inscribes the pressure response on the clock driven chart. The chart constitutes a permanent analog memory of the pressure conditions. The information contained on the chart is transcribed and processed by an operator after the chart is retrieved from the recording instrument. The evaluation of the data is lengthy in time, and the accuracy of the evaluation is subject to not only the physical conditions of the recording stylus, but also to the skill of the evaluator.

During the past decade, three electronic improvements have been introduced for digitizing and digitally recording of pressure and temperature information obtained from oil bearing reservoir. Examples of these apparatuses are described in U.S. Pat. Nos. 3,977,245; 4,033,186; and 4,195,349. U.S. Pat. No. 3,977,245 introduced the use of a random access memory as a recording medium, while U.S. Pat. No. 4,033,186 described the use of magnetic core type memory. A digitization method was introduced in U.S. Pat. No. 4,195,349 which not only used a solid state memory but provided optical encoding together with linear digital compensation techniques for compensating for temperature variations. Heretofore the use of solid state or semiconductor memories was limited because the memories were volatile in nature. Even though the prior art teachings represent important improvements in the recording of environmental conditions as well as the digitization and digital compensation of the data to be recorded, significant errors sometimes arose from the transducers and the linear compensation techniques used because of the nonlinear nature of the temperature dependencies of the pressure transducers.

SUMMARY OF THE INVENTION

An environmental measuring and recording apparatus includes a pressure transducer for measuring of pressure conditions in an oil reservoir. A temperature transducer is used to measure the temperature to which the pressure transducer is subjected. The measured temperature is used to compensate the pressure transducer and a resulting compensated signal is digitized and stored in a memory unit. Because of the extreme environmental conditions in which the electronic apparatus is to operate the memory unit has the capabilities to be periodically refreshed and to retain data after the removal of power.

The pressure and temperature transducers are mounted on a common heat sink and provide pseudo digital representation of the environmental conditions.

It is the object of this invention to provide an environmental condition sensing and recording apparatus which will precisely measure and permanently record pressure conditions in an extreme temperature environment.

It is another object of this invention to compensate for temperature anomalies of the pressure measuring transducers.

It is yet another object of this invention to provide a magnified resolution of the measured information.

It is yet another object of this invention to store the measured temperature in a programmable memory that will operate under extreme environmental conditions.

BRIEF DESCRIPTION OF THE DRAWINGS

In order that the invention may be readily carried into practice, a number of embodiments will now be described in detail by way of example, with reference to the accompanying drawings in which.

DETAILED DESCRIPTION OF THE PREFERRED EMBODIMENT

Figure 1:
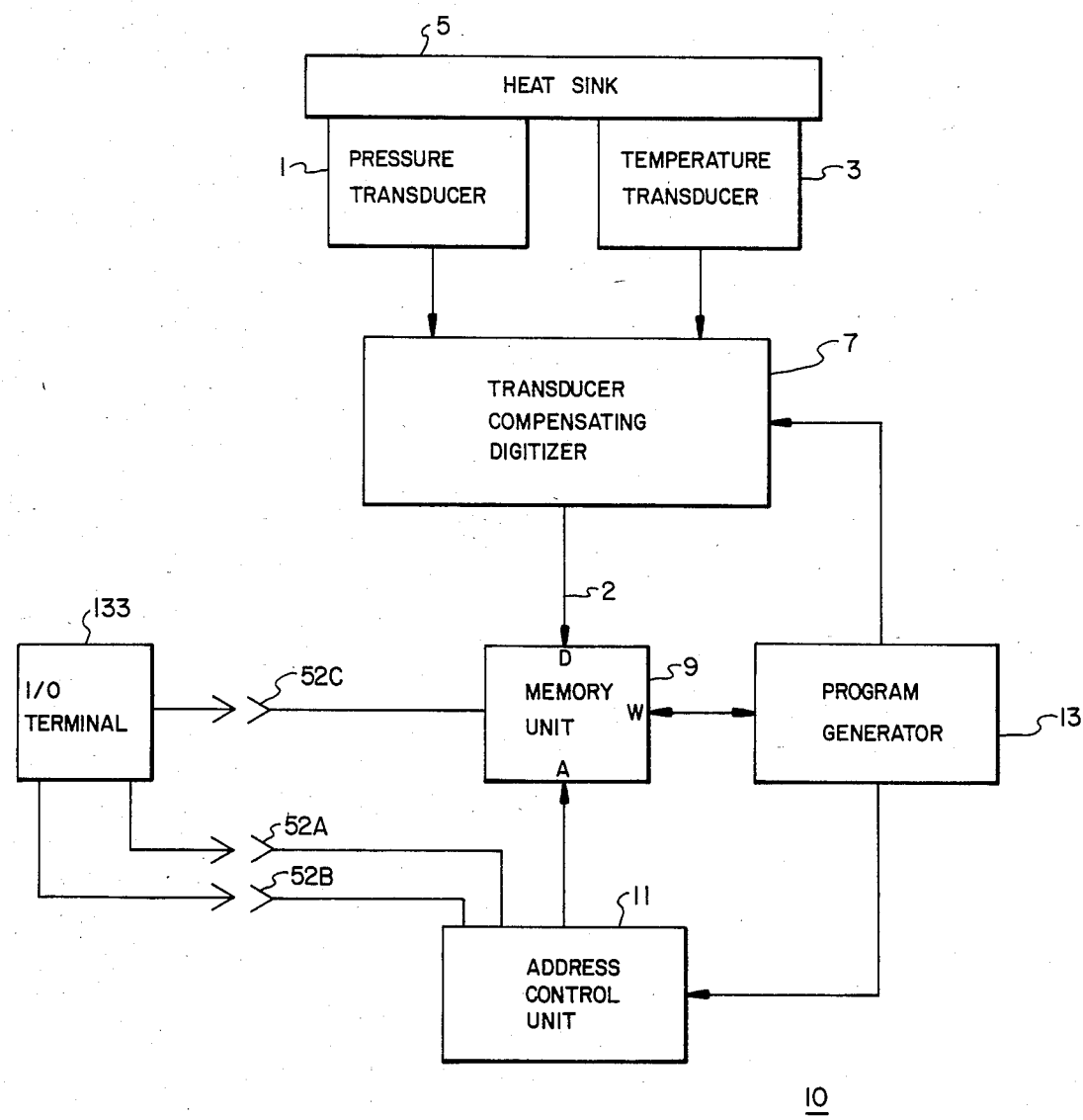
FIG. 1 is a block diagram of an environmental measuring and recording apparatus according to the invention.

Referring to FIG. 1, a block diagram of an oil reservoir measuring and recording instrument 10 for measuring and recording the down hole, the bottom of an oil well, environmental conditions and includes a pressure transducer 1 and a temperature transducer 3 which in the preferred embodiment are thermally tied together with a common heat sink 5 and constructed according to the apparatus disclosed in my U.S. Pat. No. 4,279,155 entitled "A Bourdon Tube Transducers". The Bourdon tube transducers in the above referenced patent will provide a pseudo digital representation for the appropriate environmental condition that is being sensed. The output of the pressure transducer 1 and the temperature transducer 3 are applied to a temperature compensating digitizer 7, which is a device such as that disclosed in my U.S. Patent Application entitled "A Transducer Compensating Digitizer" filed on July 20, 1981, Ser. No. 285,385, now U.S. Pat. No. 4,444,055, which is hereby incorporated by reference and which will provide as an output on conductor 2 a digital representation of the pressure conditions that are sensed by the pressure transducer 1 and compensated for by the temperature transducer 3. The signals on conductor 2 are digital signals that digitally represent the compensated pressure measurement. The transducer compensating digitizer 7 provides an enable signal to a program generator 13 which controls a memory unit 9, as well as an address control unit 11. Upon command the compensated and digitized pressure from the pressure transducer 1 is applied to the memory unit 9 where it is stored in an address that is provided by the address control unit 11.

Periodically, because of the extreme environmental conditions, the program generator 13 will initiate a command to the memory unit 9 and the address control unit 11 so that the data that is stored in each address of the memory unit is refreshed to its original logic level.

An I/O terminal 133 is used to extract the stored information, in the form of digital data, from the memory unit 9 after the environmental measuring and recording apparatus 10 has been extracted from the oil reservoir.

Figure 2:
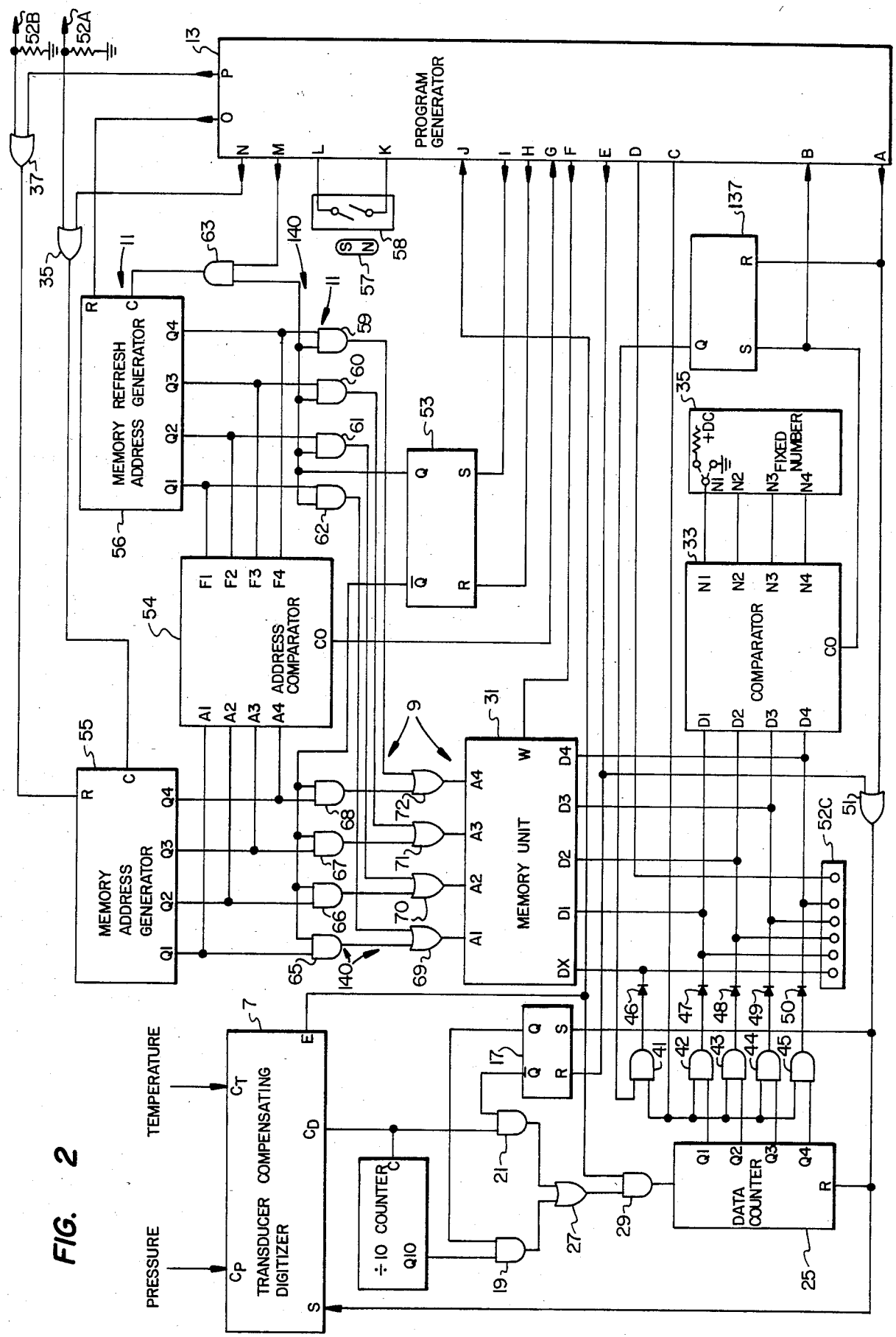
FIG. 2 is a schematic diagram of the environmental measuring and recording apparatus according to the invention.

Referring now to FIG. 2, which is a schematic diagram of the address control unit 11 and the memory unit 9. The outputs from the pressure transducer 1 and the temperature transducer 3 are applied to the transducer compensating digitizer 7 at the CP and CT terminals respectively. With the application of a starting pulse to the S terminal of the transducer compensating digitizer 7 from the program controller 13, a stream of data pulses that represents the compensated pressure as measured by the pressure transducer 1 and temperature compensated digitizer 7 will appear on the CD terminal of the transducer compensating digitizer 7 after the expiration of a compensating time. The start pulse also sets an expand flip-flop 17 which provides a non-expand mode signal to a multiplexer that is configured by AND gates 19 and 21. The setting of the expand flip-flop 17 enables AND gate 19 and disables AND gate 21. A divide by 10 counter 23 divides the stream of data pulses and passes the divided pulses to a data counter 25 by AND gate 19, OR gate 27, and AND gate 29. A data word is formatted by the data counter 25 and transmitted to the data output terminals of memory unit 31 and also to the data input terminals of comparator 33. The data word is loaded into the memory unit if the results of the comparison by the comparator 33 indicates that the expand mode is not required. If the expand mode is required the data word is discarded.

Each time a data word is loaded into the memory unit 31, the data stored in each address of the memory unit 31 is refreshed and restored to its original logic level.

The expand mode is implemented by the results of the comparison performed by the comparator 33. If the results of the comparison indicate that the data word in the data counter 25 is less than the threshold that is established by a fixed number generator, then an expanded data word is accumulated in the data counter 25 and stored in the memory unit 31 prior to the refresh cycle.

Terminals N1 through N4 of the comparator 33 are connected to the output terminals of the fixed number generator 35. The fixed number generator applies either logic 0 or a logic 1 to the N1 through N4 terminals to establish a threshold that below which the resolution of the data that is applied to the memory unit 31 is expanded. The data word and the fixed number are compared by the comparator 33. If the data word is smaller than the fixed number, the comparator 33 will transmit a logic signal to the program generator 13 and also set an RS flip-flop 37. In response to the logic signal from the CO terminal of the comparator 33, the program generator 13 will transmit a single logic pulse from its E terminal via OR gate 51 to reset the flip-flop 17. With this pulse, the flip-flop 17 and also the data counter 25 are reset and the transducer compensating digitizer 7 is restarted to generate another set of data clock pulses. Since the flip-flop 17 is in the reset state, the AND gate 19 is disabled and AND gate 21 is enabled. Consequently, the stream of data pulses from the transducer compensating digitizer 7 is applied directly to the data counter 25 through AND gate 21, OR gate 27 and AND gate 29. The flip-flop 137 enables AND gate 41 which provides a logic 1 to the DX terminal of the memory unit 31. The existence of a logic 1 on the DX terminal indicates that the resolution of the data word is multiplied by 10. A numeric example will clarify this point. If the original data word represents 251 pounds per square inch, psi, it will be generated as 2510 psi. This will enable the operator to make pressure readings in the tenth of psi increments at the lower pressure ranges. The data word that include the logic signals that are present on Q1 through Q4 terminals of the data counter 25 are applied to the D1 through D4 terminals of the memory unit 31 via the AND gates 42 through 45 and diodes 47 through 50. The program generator 13 will transmit a write pulse from terminal F to the W terminal of the memory unit 31 after an address word is generated by the memory address generator 55 and applied from terminals Q1 through Q4 of the memory address generator 55 to the address terminals A1 through A4 of the memory unit 31 via the AND gates 65 through 68, and the OR gates 69 through 72. The data word that is present on the DX and D1 through D4 terminals at the memory unit 31 are thus stored in the address that is present at the A1 through A4 terminals of the memory unit 31.

The address control unit 11 includes the memory refresh address generator 56, the memory address generator 55, the address comparator 54, as well as the associated circuitry.

The address control unit 11 operates when a start pulse is applied to the C terminal of the memory address generator 55 from the N terminal of the program generator 13. Upon receiving of the start pulse, the memory address generator 55, which in the preferred embodiment is a counter, increments the address word at the Q1 through the Q4 terminals by 1. The address information, which is generated by the memory address generator 55, is transmitted to the address terminals A1 through A4 of the memory unit 31 through a multiplexer 140 that includes the AND gates 65 through 68 and OR gates 69 through 72, as well as AND gates 59 through 62. This address word remains on until the AND gates 65 through 68 are disabled by the program generator 13 through the setting of flip-flop 53 after the write pulse is generated by the program generator 13 and transmitted to the terminal W of the memory unit 31. As soon as the AND gates 65 through 68 are disabled, AND gates 59 through 62 are enabled by a refresh pulse which is generated by the program controller 13 and transmitted to the set terminal of the RS flip-flop 53 from terminal I of the program generator 13. At this point the memory refresh address generator 56, which in the preferred embodiment is also the counter, will sequentially generate the address word and transmit to a memory unit 31 through the AND gates 59 through 62 and the OR gates 69 through 72. The address word which is generated by the memory refresh address generator 56 is compared with the last address word of memory address generator 55 by a comparator 54. The memory refresh address generator 56 is sequentially incremented until its output becomes equal to the address word that is stored in the Q1 through Q4 terminals of the memory address generator 55.

The memory unit 31 acts as a mirror memory unit because the output terminals are also the input terminals for loading data into memory. Terminals DX and D1 through D4 of the memory unit 31 are isolated from the output terminals Q1 through Q4 of the data counter 25 by the blocking diodes 46 through 50 and the disabling of the AND gates 41 through 45 by the logic level provided by the program generator 13 at terminal C.

When there is a comparison as indicated by the logic signal on the CO terminal on the address comparator 54 the output of the comparator will be transmitted to the program generator 13 and in return a pulse will be provided by the program generator 13 and transmitted to the R terminal of flip-flop 53 from the H terminal of the program generator 13 resetting flip-flop 53 and disabling the AND gates 59 through 63, and enabling AND gates 65 through 68 readying the memory to accept another data word at the next address location. AND gate 63 is used to couple the clock from the program generator 13 to the memory refresh address generator 56 and, in particular, from terminal M of the program generator 13.

The program generator 13 is enabled by the closing of the contacts of a reed switch 58 by a magnet 57 which, when rotated, enables the program generator 13, as well as the remainder of the circuit. The reason for this is because of the lengthly time it takes to prepare to lower the environmental measuring and recording unit 10 down to the oil reservoir, which allows the battery that is used to power the circuit to become essentially discharged. Consequently, the circuit is disabled until the unit is ready to lower to the oil reservoir, at which time the magnet 57 is rotated and its field is brought into contact with the reed switch 58, thereby enabling the power to the environmental measuring and recording apparatus 10. The memory unit 31 is an erasable/programmable read only memory that in the preferred embodiment has a capability of operating in a non-volatile mode and is a device such as a CDT18U42CD that is manufactured by RCA Solid State Division.

Figure 3:
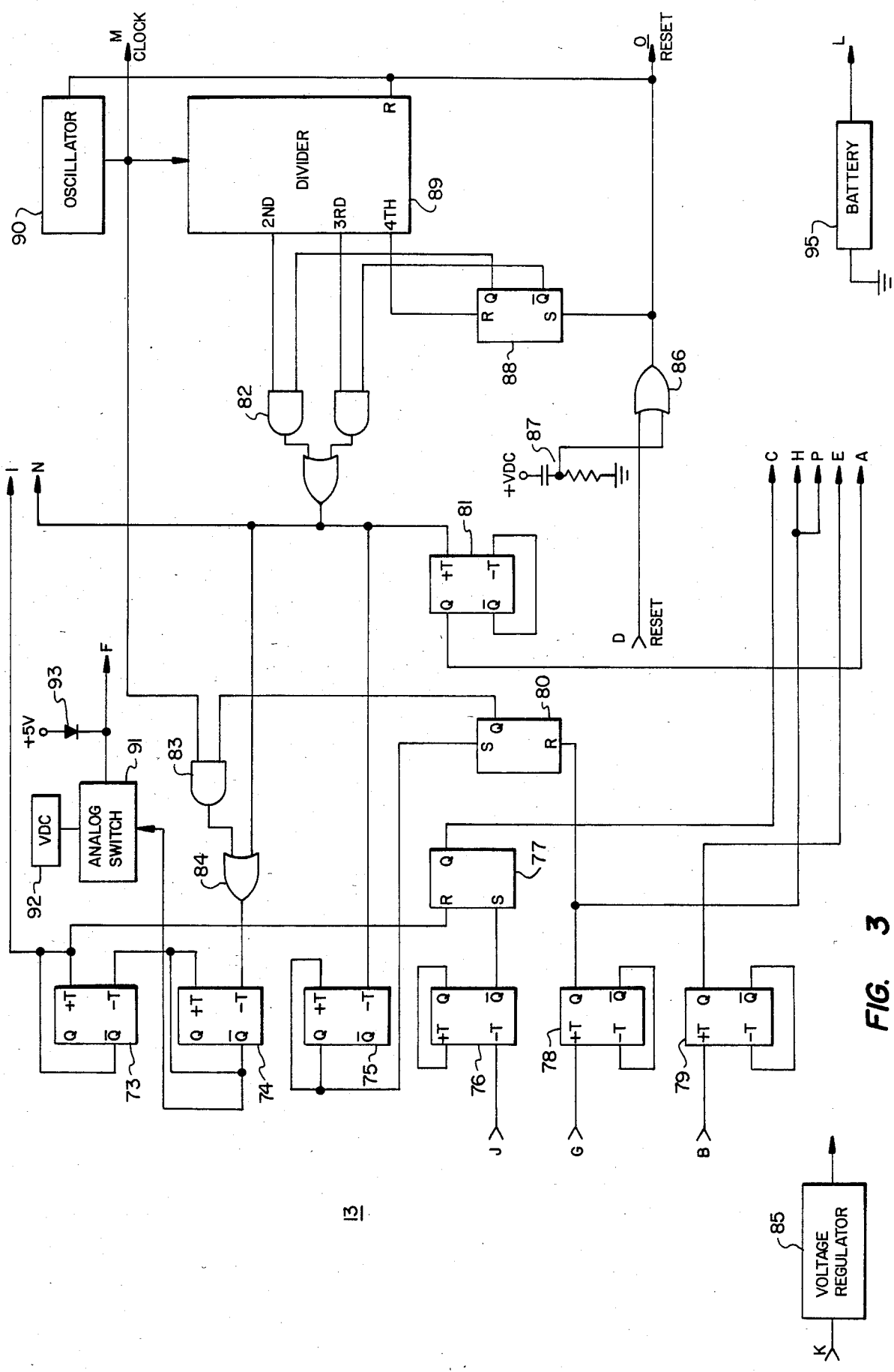
FIG. 3 is a schematic diagram of a program controller that is used to control the environmental measuring and recording apparatus of FIG. 2.

FIG. 3, to which reference should now be made in conjunction with FIG. 2, is a schematic diagram of the program generator 13. A start pulse or initiate pulse is provided on terminal A from the Q terminal of single-shot multivibrator 81. All multivibrators in the preferred embodiment of the program generator 13 are devices such as a 4098 manufactured by RCA Semiconductor Division. A free running oscillator 90 provides a stream of pulses to a divider 89 where the stream of pulses is divided down into three periods of time, and clock pulses to the M terminal of the program generator 13. The program generator 13 provides an initiate pulse to the transducer compensating digitizer every time a pulse appears at the 2nd period time until there is a pulse provided at the 4th period terminal, at which time an initiate pulse occurs every 3rd period. In the preferred embodiment, the 2nd period is 10 minutes, the third period is 1 hour and the 4th is 4 hours. The pulse from the 4th period terminal of the divider 89 is used to reset a flip-flop 88 that is set by an initial power up from a pulse generated by the RC network 87 or a reset pulse that is applied to terminal D. The power up reset or the reset pulse is ORed by OR gate 86 and is provided out on terminal O to reset the environmental measuring and recording apparatus 10. At reset the RS flip-flop 88 is set and the Q terminal is connected to the AND/OR gate 82. The output from the 2nd period terminal of the divider 89 is coupled by the AND/OR gate 82 to the one-shot multivibrator 81 as well as to terminal N, where it is used to advance the address generator 55. The setting of the one-shot multivibrator 81 will provide a pulse to initiate a command on terminal A which will start the transducer compensating digitizer 7 of FIG. 2.

The data storage cycle, excluding the expand mode, begins with an initiate pulse from the output of the AND/OR gate 82 either every 2nd period or every 3rd period. The output of the AND/OR gate 82 causes an initiate pulse to be applied to terminal A for the period of time that is established by the single-shot multivibrator 81. At the falling edge of the pulse from the output of the AND/OR gate 82, single-shot multivibrators 74 and 75 are set. The setting of multivibrator 74 causes a write pulse to be applied to terminal F for the period of time that is established by the single-shot multivibrator 74. At the timing out of the single-shot multivibrator 74, the refresh cycle is initiated for a time period established by the pulse on terminal I from the single-shot multivibrator 73.

The multivibrator 75 sets RS flip-flop 80 which enables AND gate 83 causing a write pulse to occur every clock pulse. This process continues until the add compare pulse is received from comparator 54 via terminal G which resets the RS flip-flop 80.

The AND gates 41 through 45 are only enabled by the setting of RS flip-flop 77, whose Q terminal is connected to terminal C. RS flip-flop 77 is enabled by single-shot multivibrator 76 from a pulse provided on the T terminal from the transducer compensating digitizer 7, indicating that a data word is ready to be stored.

The expand mode discards the first data word and the expanded word is obtained prior to the write pulse being provided on terminal F.

A compare pulse from the comparator 33 comes in on terminal B and sets the single-shot multivibrator 79. The single-shot multivibrator 79 provides a pulse on terminal E which provides reset to the R terminal of flip flop 37, which initiates the data counter 25 and the transducer compensating digitizer 7. The output of the transducer compensating digitizer 7 provides a pulse on its E terminal when data is ready to be stored. This enables the AND gate 29 of FIG. 2 as well as setting the one single-shot multivibrator 76 at the J terminal of the program generator 13. The Q(not) terminal of the single-shot multivibrator 76 sets the S terminal of the flip-flop 77, which provides an enable pulse to the C terminal that enables the AND gates 41 through 45 for the loading into memory of the data word that is stored in the counter 25. The RS flip-flop 77 is reset by the re-write-reset command that is present at terminal I and is generated by the setting of the single-shot multivibrator 73. The single-shot multivibrator 73 is set by single-shot multivibrator 74, which is set by the output of the OR gate 84, and has a time period long enough to ensure the collection of the expanded data word. The output of the OR gate 84 is enabled by the output of the AND/OR gate 82 which occurs when the signal on the Q terminal of the RS flip-flop 88 is high and a pulse occurs at the second output of the divider 89 or when the Q(not) terminal of the RS flip-flop 88 is high and a pulse is present at the third divider output of the divider 89. The RS flip-flop 88 is reset by a pulse occurring on the fourth divider output of the divider 89.

The output of the AND/OR gate 82 is ORed by output of the OR gate 84 with the AND gate 83. The AND gate 83 combines the output from the free running oscillator 90 with the output of the RS flip-flop 80 to set the single-shot multivibrator 74 during the refresh mode. At the setting of the single-shot multivibrator 74, the single-shot multivibrator 73 is set, as well as the analog switch 91, which provides a write pulse on terminal F for either refreshing the memory unit 31 or loading data into memory unit 31.

There is normally present a positive voltage bias, such as five volts, that is applied to the F terminal from the plus five volts DC source and the diode 93. With the analog switch 91 enabled a plus twenty volts is applied to the write terminal W of the memory unit 31 which loads data into the memory unit 31 according to the address word that is present on the A1 through A4 terminals.

The output from the address comparator 54 is applied to the G terminal of the program generator 13 which indicates the end of the refresh mode and terminal P resets the memory address generator 55.

The switch 58 connects the L terminal to the K terminal. The L terminal is the output of battery 95 and the K terminal regulates the battery voltage by being connected to a voltage regulator 85 the output of which is used to control the logic elements contained within the program generator 13, as well as the other circuitry of the environmental measuring and recording apparatus 10 of FIG. 1.

After the data is collected and the environmental, measurement and recording apparatus 10 is extracted from the oil reservoir, the program generator 13 is disabled by rotating the magnet 57. The I/O terminal 33 is connected to terminals 52A through 52C. A reset pulse is applied to the memory address generator 55 via OR gate 37 and clock pulses via OR gate 35. The contents of the memory unit 31 is then extracted as the memory address generator 55 generates each unique address loaded into the I/O terminal 33.

Many changes and modifications in the above described invention can, of course, be carried out without departing from the scope thereof. Accordingly, the invention is intended to be limited only by the scope of the appended claims.

I claim:

1. An environmental measuring and recording apparatus comprising:
   pressure sensing means for sensing of a first environmental condition to obtain a first signal therefrom;
   temperature sensing means for sensing of a second environmental condition to obtain a second signal therefrom;
   compensation means for compensating the first signal with the second signal to obtain a digital signal thereby;
   memory means for storing digital data therein represented by the digital signal; and
   program control means for controlling the storage of the digital data in the memory means and for periodically updating the contents of the memory means.

2. The environmental measuring and recording apparatus according to claim 1 further comprising:
   expander means for expanding the digital signal when the digital signal is less than a first selected threshold.

3. The environmental measuring and recording apparatus according to claim 2 wherein the compensation means and expander means, comprises:
   first divider means for dividing the digital signal by 10 to obtain a third signal;
   first multiplexer means for multiplexing the digital signal and the third signal to obtain a store signal, the multiplexer means being under the control of an expand signal;
   word format means for formatting the store signal into a digital word acceptable to the memory means;
   threshold generator means for generating the first selected selected threshold;
   comparator means for comparing the first selected threshold with the digital word and to provide the expand signal when the digital word is less than the first selected threshold, the expand signal being connected to the first multiplexer means such that when present the store signal is the fourth signal.

4. The environmental measuring and recording apparatus according to claim 1 wherein the program controller and the compensation means comprises:
   word format means for formatting the digital signal into a digital word;
   address generator means for generating a unique memory address for each digital word;
   store command generator means for generating a store signal in response to which the memory means will load the digital word at the unique address;
   refresh means for refreshing the stored digital word at each unique address.

5. The environmental measuring and recording apparatus according to claim 4 wherein the refresh means comprises:
   high speed clock means for providing a high speed stream of clock pulses;
   enable means for generating a refresh signal after each store signal;
   enable means for generating a refresh signal after each store signal;
   counter means for counting the pulses in the stream of clock pluses when enable by the refresh signal;
   multiplexer means for multiplexing the unique address to the memory means when when the refresh signal is not present and for multiplexing the count in the counter means to the memory means as an address when the refresh signal is present;
   comparator means for comparing the count in the counter means with a last unique address and for removing the refresh signal when the count in the counter means is equal to the last unique address.

6. The environmental measuring and recording apparatus according to claim 1 further comprising:
   I/O terminal means for retrieving the digital data from the memory means.

7. A method for measuring and recording environmental conditions comprising:
   sensing of a first environmental condition to obtain a first signal therefrom;
   sensing a second environmental condition to obtain a second signal therefrom;
   compensating the first signal with the second signal to obtain a digital signal thereby;
   storing digital data that is represented by the digital signal in a memory means; and
   controlling the storage of the digital data in the memory means and for periodically updating the contents of the memory means.

8. The method according to claim 7 further comprising the steps of:
   expanding the digital signal when the digital signal is less than a first selected threshold.

9. The method according to claim 8 wherein the step of expanding the digital signal comprises:
- dividing the digital signal by 10 to obtain a third signal;
- multiplexing the digital signal and the third signal to obtain a store signal with a multiplexer means, the multiplexer means being under control of an expand signal;
- formatting the store signal into a digital word acceptable to the memory means;
- generating the first selected threshold;
- comparing the first selected threshold with the digital word to provide the expand signal when the digital word is less than the first selected threshold, the expand signal being connected to the multiplexer means such that when present the store signal is the digital signal and when not present the store signal is the third signal.

10. The method according to claim 7 wherein the step of controlling the storage of the digital signal comprises:
- formatting the digital signal into a digital word;
- generating a unique memory address for each digital word;
- generating a store signal in response to which the memory means will load the digital word at the unique address;
- refreshing each stored digital word at each unique address.

11. The method according to claim 10 wherein the step of refreshing each stored digital word comprises:
- providing a high speed stream of clock pulses;
- generating a refresh signal after each store signal;
- counter means for counting the pulses in the stream of clock pulses when enabled by the refresh signal;
- multiplexing the unique address to the memory means when the refresh signal is not present and multiplexing the count in the counter means to the memory means as an address when the refresh signal is present;
- comparing the count in the counter means with a last unique address and for removing the refresh signal when the count in the counter means is equal to the last unique address.

12. The method according to claim 7 further comprising the steps of:
- retrieving the digital words from the memory means.

* * * * *